United States Patent
Homan et al.

(10) Patent No.: US 7,594,560 B2
(45) Date of Patent: Sep. 29, 2009

(54) FOUR-WHEEL DRIVE VEHICLE

(75) Inventors: Akinori Homan, Toyota (JP); Satoshi Munakata, Nishikamo-gun (JP); Yoshiyuki Aoyama, Nishio (JP); Kazutaka Noguchi, Ichinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 600 days.

(21) Appl. No.: 11/399,431

(22) Filed: Apr. 7, 2006

(65) Prior Publication Data
US 2006/0231315 A1 Oct. 19, 2006

(30) Foreign Application Priority Data
Apr. 13, 2005 (JP) .............................. 2005-115957

(51) Int. Cl.
*B60K 17/34* (2006.01)
(52) U.S. Cl. .......................... 180/233; 180/247; 701/89
(58) Field of Classification Search ................. 180/233, 180/247; 701/89
See application file for complete search history.

(56) References Cited

U.S. PATENT DOCUMENTS 6,094,614 A * 7/2000 Hiwatashi .................... 701/89
6,549,840 B1 * 4/2003 Mikami et al. ................ 701/69
6,630,813 B2 * 10/2003 Berels et al. ................. 320/132

FOREIGN PATENT DOCUMENTS

| JP | 3-148337 | 6/1991 |
| JP | 4-297335 | 10/1992 |

* cited by examiner

*Primary Examiner*—Lesley D Morris
*Assistant Examiner*—Michael R Stabley
(74) *Attorney, Agent, or Firm*—Oblon, Spivak, McClelland, Maier & Neustadt, P.C.

(57) ABSTRACT

A vehicle includes a sensor sensing external temperature, a 2WD/4WD switch operated to input an instruction to switch a two-wheel drive state and a four-wheel drive state, a transfer switching mechanical power transfer for the two-wheel drive state and that for the four-wheel drive state, an actuator actuating the transfer, and an ECU controlling the actuator. The ECU determines from a value detected by the sensor a current supplied to the actuator. Preferably, the transfer includes a synchronizer mechanism driven by power generated by the actuator to transfer a drive shaft's rotation to a driven shaft and engage the shafts together when they achieve synchronous rotation.

5 Claims, 4 Drawing Sheets

FOUR-WHEEL DRIVE VEHICLE

This nonprovisional application is based on Japanese Patent Application No. 2005-115957 filed with the Japan Patent Office on Apr. 13, 2005, the entire contents of which are hereby incorporated by reference.

BACKGROUND OF THE INVENTION

1. Field of the Invention

The present invention relates generally to four-wheel drive vehicles and particularly to four-wheel drive vehicles switchable between two-wheel drive and four-wheel drive.

2. Description of the Background Art

Some four-wheel drive vehicles adopt a so-called part time 4WD system allowing switching between a two-wheel drive mode suitable for typically running on a significantly safe, dry road and excellent in mileage and a four-wheel drive mode suitable for running in the rain and/or snow or on a bad road and the like.

Japanese Patent Laying-Open No. 03-148337 discloses a drive state switching device provided in a vehicle switchable between such four-wheel drive and two-wheel drive and actuated by an actuator.

When the drive state switching device switches a drive state, the device requires a period of time, which significantly depends on the viscosity of a working fluid in a case housing the device. However, such devices disclosed in documents including Japanese Patent Laying-Open No. 03-148337 are actuated by actuators actuated on a current having a fixed value.

Typically, sports utility vehicles (SUVs), pickup trucks and other similar vehicles have a two-wheel drive mode, a four-wheel drive mode and a variety of other drive power transfer modes switched by a mechanism configured in a transfer. The "transfer" as referred to herein indicates is a portion extracting a torque from a powertrain of a drive system serving as a base (e.g. FF, FR) to a side that is originally not a driving wheel, i.e., a portion extracting a torque transferred from a powertrain associated with a full time driving wheel to a driving wheel which is not a full time driving wheel.

The switching mechanism provided in the transfer requires a disadvantageously long period of time to switch in winter and/or in cold districts in particular as external temperature varies and accordingly the transfer's interior, a front diff configuring a driving system, and the like vary in drag resistance and the like. This is attributed to the fact that at low temperature the lubricant oil increases in viscosity and the variation in drag resistance of the transfer, the front diff and the like is significantly affected by the variation in viscosity of the lubricant oil. In addition, a motor is used as an actuator producing thrust required for switching has a rotation shaft support fitted with a precision varying with temperature and the rotation shaft slides against varying resistance, and such also affects the switching.

As such, if in winter a vehicle set in the two-wheel drive state in the previous day is started by a driver in the following morning and immediately thereafter the driver operates a switch to switch the vehicle from two-wheel drive to four-wheel drive, the vehicle may not readily switch to four-wheel drive.

SUMMARY OF THE INVENTION

The present invention contemplates a four-wheel drive vehicle switchable between four-wheel drive and two-wheel drive within a reduced period of time.

In summery the present invention provides a four-wheel drive vehicle including: a detector detecting external temperature; an input device operated to input an instruction to switch a two-wheel drive state and a four-wheel drive state; a switch switching mechanical power transfer for the two-wheel drive state and that for the four-wheel drive state; an actuator actuating the switch; and a controller controlling the actuator, wherein the controller depends on a value detected by the detector to determine a current supplied to the actuator.

The present invention in another aspect provides a four-wheel drive vehicle including: a detector detecting a working fluid in temperature; an input device operated to input an instruction to switch a two-wheel drive state and a four-wheel drive state; a switch switching mechanical power transfer for the two-wheel drive state and that for the four-wheel drive state; an actuator actuating the switch; and a controller controlling the actuator, wherein the controller depends on a value detected by the detector to determine a current supplied to the actuator.

The present invention in still another aspect provides a four-wheel drive vehicle including: a detector detecting a working fluid in viscosity; an input device operated to input an instruction to switch a two-wheel drive state and a four-wheel drive state; a switch switching mechanical power transfer for the two-wheel drive state and that for the four-wheel drive state; an actuator actuating the switch; and a controller controlling the actuator, wherein the controller depends on a value detected by the detector to determine a current supplied to the actuator.

Preferably, in the present four-wheel drive vehicle, the switch includes a synchronizer mechanism driven by power generated by the actuator to transfer rotation of a drive shaft to a driven shaft and engage the shafts together when the shafts achieve synchronous rotation.

Preferably, the present four-wheel drive vehicle further includes a mechanical power source; a rear propeller shaft for driving a rear wheel; and a front propeller shaft for driving a front wheel. The switch unit transfers a torque generated by the-power source to only one of the rear propeller shaft and the front propeller shaft in the two-wheel drive state, and transfers the torque generated by the power source to both of the rear propeller shaft and the front propeller shaft in the four-wheel drive state.

More preferably, the mechanical power source is an engine, and the four-wheel drive vehicle further includes a transmission transferring the torque received from the engine to the switch unit.

Preferably, the actuator is an electric motor, and the controller determines the current supplied to the actuator with reference to a map recording a current value corresponding to a temperature.

In accordance with the present invention if there is large drag resistance in switching a drive state the drive state can be switched with improved responsiveness.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention will be described in embodiments with reference to the drawings more specifically. In the figures, identical or corresponding components are identically denoted.

First Embodiment

Figure 1:
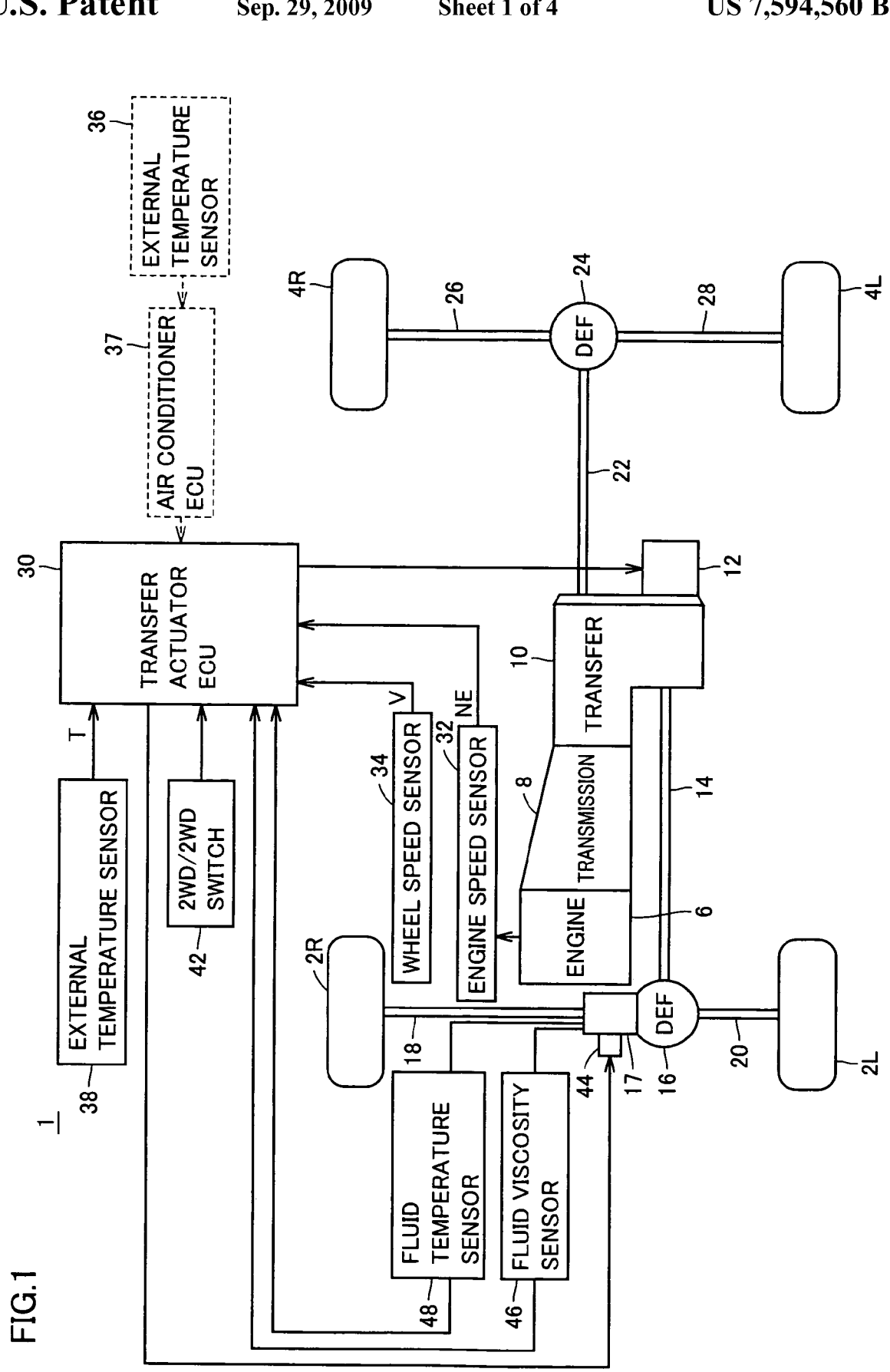
FIG. 1 is a block diagram showing a configuration of a vehicle 1 in an embodiment of the present invention.

FIG. 1 is a block diagram showing a configuration of a vehicle 1 in an embodiment of the present invention.

With reference to FIG. 1, vehicle 1 includes front wheels 2L and 2R, rear wheels 4L and 4R, an engine 6, a transmission 8 and a transfer 10.

Transfer 10 is a component extracting a torque transmitted from a powertrain in a base driving mode (rear wheel drive in FIG. 1) to the wheels which are not originally driving wheels (the front wheels in FIG. 1). Vehicle 1 further includes a transfer actuator implemented by a motor 12, a front propeller shaft 14, a front diff 16 and front drive shafts 18, 20.

Vehicle 1 further includes a rear propeller shaft 22, a rear diff 24 and rear drive shafts 26, 28.

Transfer 10 has a center diff incorporated therein. Motor 12 is, for example, an electric motor. As the motor rotates, a shift fork moves to cause a movement of a sleeve got caught in the shift fork and thereby to switch a two-wheel drive state and a four-wheel drive state.

In the two-wheel drive state, transfer 10 transfers the torque received from transmission 8 only to rear propeller shaft 22 but not to front propeller shaft 14.

In the four-wheel drive state, transfer 10 transfers the torque received from transmission 8 to both rear propeller shaft 22 and front propeller shaft 14.

Vehicle 1 further includes an engine speed sensor 32 sensing an engine speed NE, and a wheel speed sensor 34 sensing a vehicle speed V.

Vehicle 1 further includes a 2WD/4WD switch 42 operative to input an instruction to switch between the two-wheel drive state and the four-wheel drive state, and a transfer actuator ECU 30 controlling motor 12 in accordance with a value obtained from each sensor and how the switches are set.

Vehicle 1 further includes a temperature sensor 38 sensing external temperature to output temperature T to transfer actuator ECU 30. Note that temperature sensor 38 may be replaced with a temperature sensor 36 connected to an air conditioner ECU 37 to sense external temperature to provide information of temperature via air conditioner ECU 37.

Vehicle 1 further includes a front diff switch connecting and disconnecting front diff 16 and drive shaft 18, a motor 44 serving as an actuator to switch front diff switch 17, a temperature sensor 48 sensing temperature of a working fluid internal to front diff 16 and front diff switch 17, and viscosity sensor 46 sensing the working fluid's viscosity. Transfer actuator ECU 30 determines a current driving motor 12 and 44 in accordance with external temperature T or the working fluid's temperature or viscosity.

Figure 2:
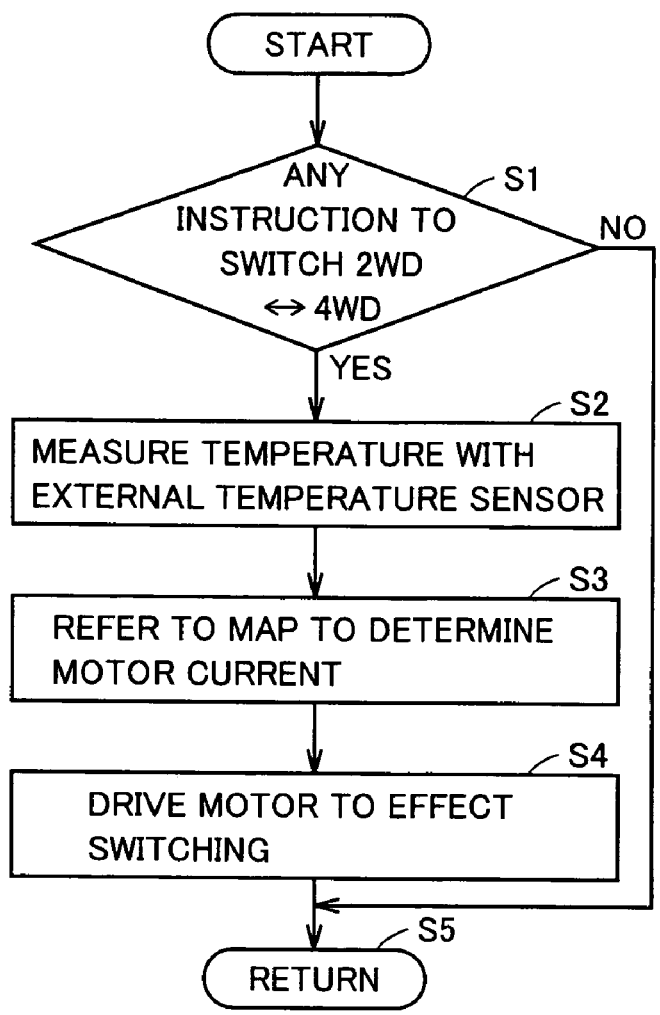
FIG. 2 is a flow chart of a program for control as executed by a transfer actuator ECU 30 shown in FIG. 1.

FIG. 2 is a flow chart of a program for control as executed by the FIG. 1 transfer actuator ECU 30. This flow chart's process is called from a main routine and executed whenever a prescribed period of time elapses or a prescribed condition is established.

With reference to FIGS. 1 and 2, the process starts, and at step S1 transfer actuator ECU 30 detects how 2WD/4WD switch 42 is set to determine whether switch 42 is set different than it was previously set to determine whether there is an instruction to switch from two-wheel drive to four-wheel drive or vice versa. If so the process proceeds to step S2. Otherwise the process proceeds to step S5 and the control is returned to the main routine.

At step S2 temperature sensor 38 measures and takes in external temperature T. Alternatively, information of external temperature measured by temperature sensor 36 may be obtained from air conditioner ECU 37. When step S2 completes, the process proceeds to step S3.

At step S3 a map is referred to to determine a current applied to drive motors 12 and 44.

Figure 3:
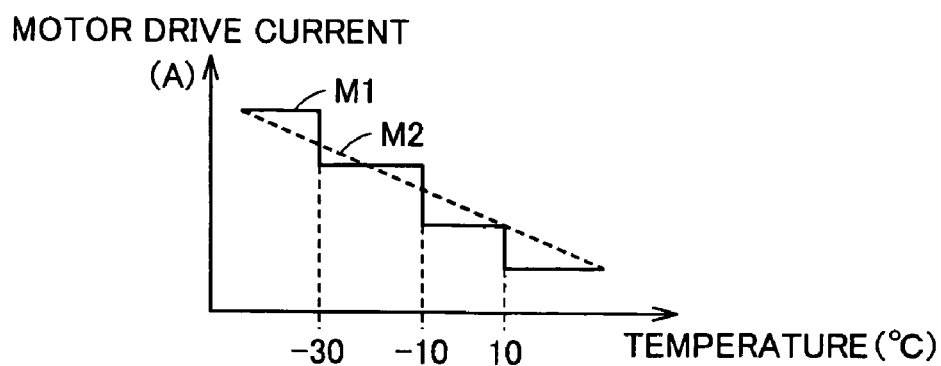
FIG. 3 shows one example of a map used to determine a motor current.

FIG. 3 shows an example of the map employed to determine the current.

As indicated in FIG. 3 by a line M1 a motor drive current varied at −30° C., −10° C. and 10° C. stepwise may be provided, or as indicated by a line M2, a gradually varying motor drive current may be provided.

Transfer 10 includes a synchronizer mechanism driven by power generated by the actuator to transfer the drive shaft's rotation to a driven shaft and allowing the shafts to engage when the shafts achieve synchronous rotation. At low temperature the FIG. 1 transfer 10, and front diff 16 and front diff switch 17 have the working fluid therein with increased viscosity. Accordingly at low temperature an increased motor drive current is provided and by large power generated by the actuator the drive shaft's rotation is transferred to the driven shaft to enable the shafts to achieve synchronous rotation within a short period of time.

Again with reference to FIG. 2 if at step S3 a motor drive current is determined the process proceeds to step S4 to drive the actuator or motor to effect the switching indicated at step S1.

For example if two-wheel drive is switched to four-wheel drive then initially the FIG. 1 transfer actuator ECU 30 instructs motors 12 and 14 to drive on a drive current as determined at step S3. In response, motor 12 is actuated and forks provided internal to transfer 10 and front diff switch 17, respectively, and connected thereto are actuated.

In response, a sleeve sandwiched by the fork presses a synchronizer ring. In response, a torque transmitted from transmission 8 is transferred to front propeller shaft 14 by the force pressing the synchronizer ring. The drive shaft and front propeller shaft 14, which is the driven shaft, rotate synchronously. In response, the sleeve moves past the synchronizer ring and engages with gear piece to transfer torque of transmission 8 to front propeller shaft 14.

Subsequently an instruction is issued to drive motor 44 and front diff switch 17 is switched to connect front diff 16 and front drive shaft 18. When they are connected, the switching completes and the vehicle is now capable of running with the four wheels all driven.

Note that FIG. 3 shows a map by way of example that provides a motor drive current decreased as temperature increases within a range of temperature for use. Alternatively, a different example of the map is also considered.

Figure 4:
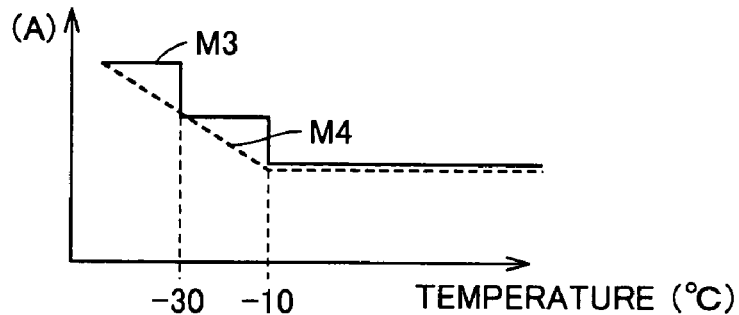
FIG. 4 shows another example of the map.

FIG. 4 shows the map in the different example.

As indicated in FIG. 4 by a line M3, a motor drive current may be provided that varies at −30° C. and −10° C., or alternatively, as indicated by a line M4, a motor drive current may be provided that has a constant value for −10° C. or higher and at −10° C. or lower gradually increases as temperature decreases.

Thus in the first embodiment a motor drive current varying with external temperature can be provided. Transfer 10 can have its internal component (a synchronizer ring in particular) increased in life, and only when required, power generated by an actuator is increased to apply larger power to press a synchronizer ring and provide larger power for actuation to allow four-wheel drive and two-wheel drive to be switched within a reduced period of time. In other words, the actuator is actuated on an electric current determined by external temperature. If there is large drag resistance in switching a drive state, the drive state can be switched with improved responsiveness.

Second Embodiment

Figure 5:
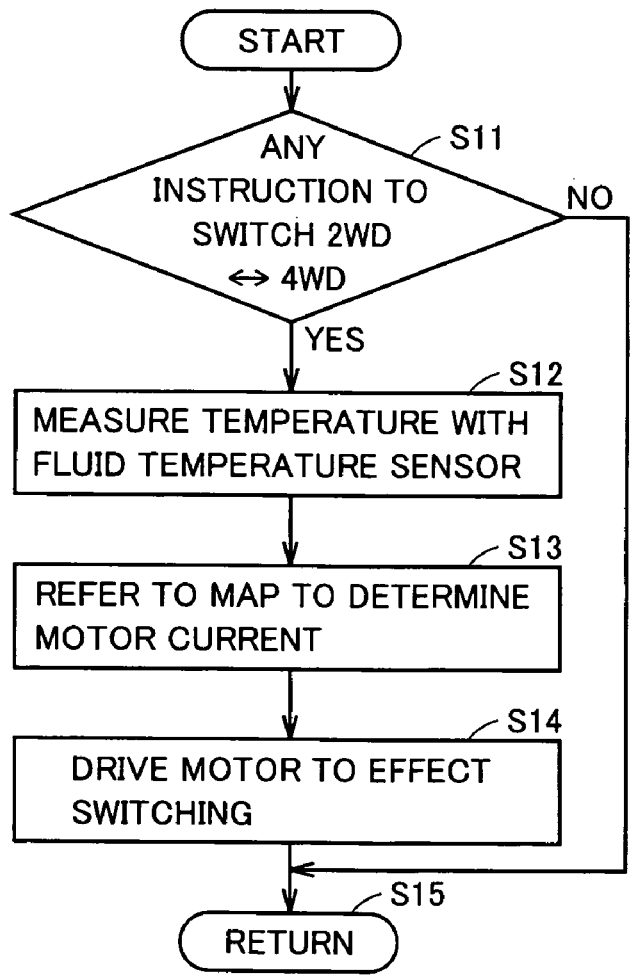
FIG. 5 is a flow chart of a program for control executed in a second embodiment.

FIG. 5 is a flow chart of a program for control executed in a second embodiment.

With reference to FIGS. 1 and 5, a process starts, and at step S11 transfer actuator ECU 30 detects how 2WD/4WD switch 42 is set to determine whether switch 42 is set different than it was previously set to determine whether there is an instruction to switch from two-wheel drive to four-wheel drive or vice versa. If so the process proceeds to step S12. Otherwise the process proceeds to step S15 and the control is returned to a main routine.

At step S12 a fluid sensor 48 measures and takes in a working fluid's temperature TOIL. When step S12 completes, the process proceeds to step S13.

At step S 13 a map is referred to to determine a current applied to drive motors 12 and 44. This map corresponds to the FIGS. 3 and 4 maps with the horizontal axis representing temperature TOIL.

If at step S3 a motor drive current is determined the process proceeds to step S14 to drive the actuator or motor to effect the switching indicated at step S11.

For example if two-wheel drive is switched to four-wheel drive then initially the FIG. 1 transfer actuator ECU 30 instructs motors 12 and 14 to drive on a drive current as determined at step S13.

Thereafter, similarly as has been described in the first embodiment, as motors 12 and 44 are actuated, torque of transmission 8 is transferred to front propeller shaft 14 and front diff switch 17 is switched. The vehicle is thus capable of running with the four wheels all driven.

In the second embodiment the actuator is actuated on an electric current determined by a working fluid's temperature. If there is large drag resistance in switching a drive state, the drive state can be switched with improved responsiveness.

While in the present embodiment the front diff switch internally has sensor 48 sensing a working fluid's temperature, alternatively the front diff's working fluid may be estimated in temperature from that of a coolant to determine a drive current.

Third Embodiment

Figure 6:
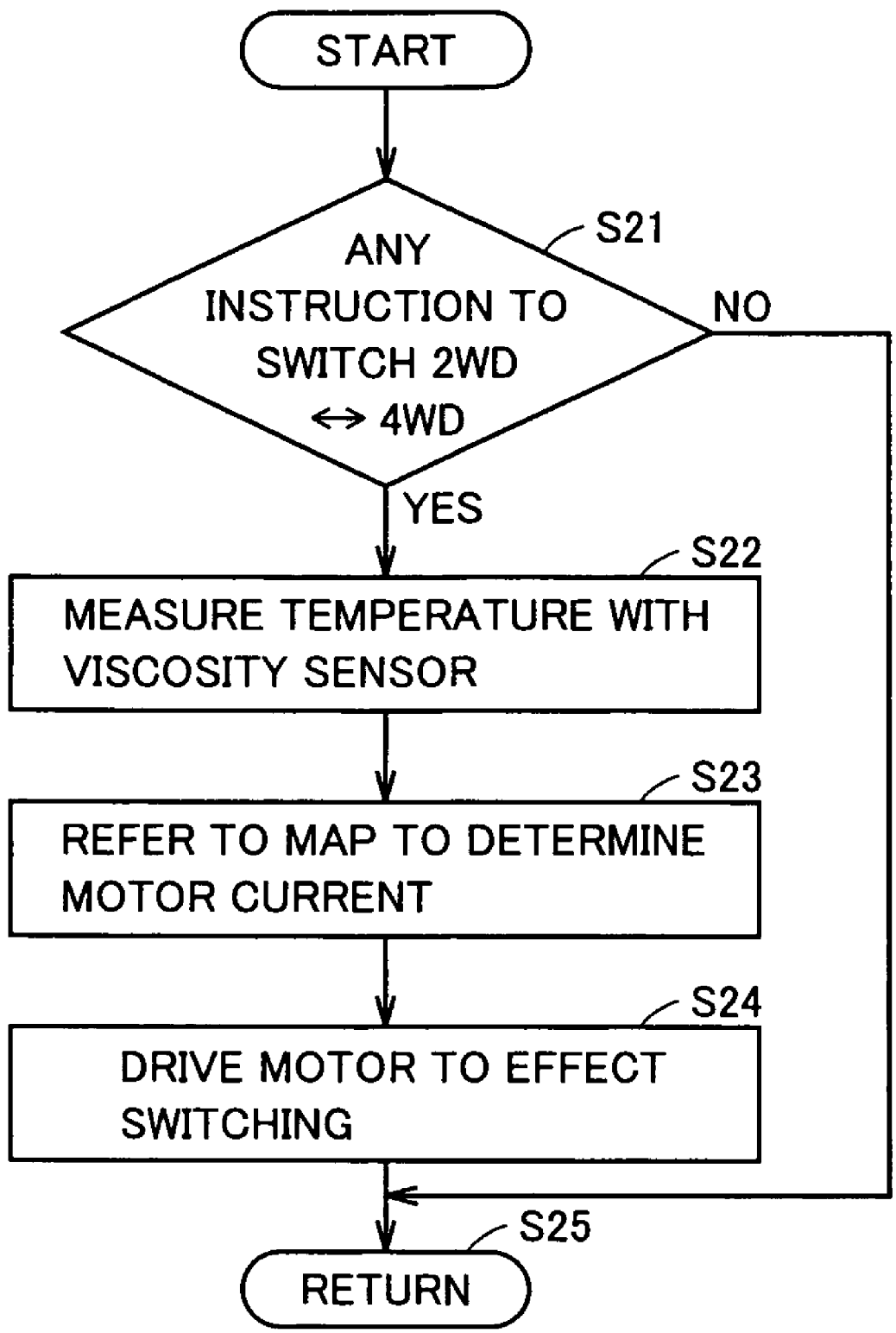
FIG. 6 is a flow chart of a program for control executed in a third embodiment.

FIG. 6 is a flow chart of a program for control as executed in a third embodiment.

With reference to FIGS. 1 and 6, a process starts, and at step S21 transfer actuator ECU 30 detects how 2WD/4WD switch 42 is set to determine whether switch 42 is set different than it was previously set to determine whether there is an instruction to switch from two-wheel drive to four-wheel drive or vice versa. If so the process proceeds to step S22. Otherwise the process proceeds to step S25 and the control is returned to a main routine.

At step S22 a viscosity sensor 48 measures and takes in a working fluid's viscosity VOIL. When step S22 completes, the process proceeds to step S23.

At step S23 a map is referred to to determine a current applied to drive motors 12 and 44. This map corresponds to the FIGS. 3 and 4 maps with the horizontal axis representing viscosity VOIL.

If at step S23 a motor drive current is determined the process proceeds to step S24 to drive the actuator or motor to effect the switching indicated at step S21.

For example if two-wheel drive is switched to four-wheel drive then initially the FIG. 1 transfer actuator ECU 30 instructs motors 12 and 44 to drive on a drive current as determined at step S23.

Thereafter, similarly as has been described in the first embodiment, as motors 12 and 44 are actuated, torque of transmission 8 is transferred to front propeller shaft 14 and front diff switch 17 is switched. The vehicle is thus capable of running with the four wheels all driven.

Note that while the embodiments described above employ transfer 10 with a center diff, the present invention is also applicable to a transfer without a center diff.

In the third embodiment the actuator is actuated on an electric current determined by a working fluid's viscosity. If there is large drag resistance in switching a drive state, the drive state can be switched with improved responsiveness.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A four-wheel drive vehicle comprising:
   a detector detecting external temperature;
   an input device operated to input an instruction to switch a two-wheel drive state and a four-wheel drive state;
   a switch unit switching mechanical power transfer for said two-wheel drive state and that for said four-wheel drive state;
   an actuator actuating said switch unit; and
   a controller controlling said actuator, wherein said controller depends on a value detected by said detector to determine a current supplied to said actuator.

2. The four-wheel drive vehicle according to claim 1, wherein said switch unit includes a synchronizer mechanism driven by power generated by said actuator to transfer rotation of a drive shaft to a driven shaft and engage said shafts together when said shafts achieve synchronous rotation.

3. The four-wheel drive vehicle according to claim 1, further comprising:
   a mechanical power source;
   a rear propeller shaft for driving a rear wheel; and
   a front propeller shaft for driving a front wheel; wherein said switch unit transfers a torque generated by said power source to only one of said rear propeller shaft and said front propeller shaft in said two-wheel drive state, and transfers the torque generated by said power source to both of said rear propeller shaft and said front propeller shaft in said four-wheel drive state.

4. The four-wheel drive vehicle according to claim 3, wherein
   said mechanical power source is an engine, and
   said four-wheel drive vehicle further comprises a transmission transferring the torque received from said engine to said switch unit.

5. The four-wheel drive vehicle according to claim 1, wherein
   said actuator is an electric motor, and
   said controller determines said current supplied to said actuator with reference to a map recording a current value corresponding to a temperature.

* * * * *